United States Patent
Zhang (10) Patent No.: US 11,237,724 B2
(45) Date of Patent: Feb. 1, 2022

(54) MOBILE TERMINAL AND METHOD FOR SPLIT SCREEN CONTROL THEREOF, AND COMPUTER READABLE STORAGE MEDIUM

(71) Applicant: GUANGDONG OPPO MOBILE TELECOMMUNICATIONS CORP., LTD., Guangdong (CN)

(72) Inventor: Weichao Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/729,220

(22) Filed: Dec. 27, 2019

(65) Prior Publication Data

US 2020/0133487 A1    Apr. 30, 2020

Related U.S. Application Data (63) Continuation of application No. PCT/CN2018/090874, filed on Jun. 12, 2018.

(30) Foreign Application Priority Data

Jun. 30, 2017 (CN) .......................... 201710526803.4

(51) Int. Cl.
*G06F 3/048* (2013.01)
*G06F 3/0488* (2013.01)
(Continued)

(52) U.S. Cl.
CPC ...... *G06F 3/04886* (2013.01); *G06F 3/04817* (2013.01); *H04M 1/72469* (2021.01); *G06F 2203/04803* (2013.01)

(58) Field of Classification Search
None
See application file for complete search history.

(56) References Cited

U.S. PATENT DOCUMENTS

2003/0189597 A1* 10/2003 Anderson ............. G06F 3/0481
715/778
2013/0218464 A1* 8/2013 Chen ................... G06F 3/04883
701/533
(Continued)

FOREIGN PATENT DOCUMENTS

| CN | 103324435 | 9/2013 |
| CN | 103543904 | 1/2014 |

(Continued)

OTHER PUBLICATIONS

WIPO, ISR for PCT/CN2018/090874, Aug. 29, 2018.
(Continued)

*Primary Examiner* — William C Trapanese
(74) *Attorney, Agent, or Firm* — Hodgson Russ LLP (57) ABSTRACT

A mobile terminal and a method for split screen control thereof, and a computer readable storage medium are provided. The method includes the following. The mobile terminal determines, in a split screen mode, a first split screen. The mobile terminal detects, in the split screen mode, an instruction for desktop display. The mobile terminal acquires a desktop icon and displays the desktop icon on the first split screen, upon receiving the instruction for desktop display.

13 Claims, 7 Drawing Sheets

(51) Int. Cl.
*G06F 3/0481* (2013.01)
*H04M 1/72469* (2021.01)

(56) References Cited

U.S. PATENT DOCUMENTS

| | | | |
|---|---|---|---|
| 2013/0263042 A1 | 10/2013 | Buening | |
| 2014/0053097 A1* | 2/2014 | Shin | G06F 3/04886 715/779 |
| 2014/0282119 A1* | 9/2014 | Wouhaybi | G06F 3/0482 715/760 |
| 2014/0351748 A1* | 11/2014 | Xia | G06F 3/0481 715/798 |
| 2015/0067588 A1 | 3/2015 | Shim et al. | |
| 2015/0185980 A1 | 7/2015 | An et al. | |
| 2015/0199086 A1* | 7/2015 | Churchill | G06F 3/04817 715/739 |
| 2015/0365306 A1 | 12/2015 | Chaudhri et al. | |

FOREIGN PATENT DOCUMENTS

| | | |
|---|---|---|
| CN | 104238949 | 12/2014 |
| CN | 104571979 | 4/2015 |
| CN | 105975840 | 9/2016 |
| CN | 104133610 | 11/2016 |
| CN | 106201166 | 12/2016 |
| CN | 104503700 | 7/2017 |
| CN | 107229411 | 10/2017 |
| WO | 2017088131 | 6/2017 |

OTHER PUBLICATIONS

EPO, Office Action for EP Application No. 18823856.2, dated Apr. 22, 2020.
SIPO, Decision on Rejection for CN Application No. 201710526803.4, dated Mar. 19, 2020.
SIPO, First Office Action for CN Application No. 201710526803.4, dated May 20, 2019.
SIPO, Second Office Action for CN Application No. 201710526803.4, dated Sep. 30, 2019.
SIPO, Third Office Action for CN Application No. 201710526803.4, dated Dec. 3, 2019.
IPI, Office Action for IN Application No. 202017001968, dated May 17, 2021.
EPO, Communication for EP Application No. 18823856.2, dated Jul. 8, 2021.

* cited by examiner

MOBILE TERMINAL AND METHOD FOR SPLIT SCREEN CONTROL THEREOF, AND COMPUTER READABLE STORAGE MEDIUM

CROSS-REFERENCE TO RELATED APPLICATION(S)

This application is a continuation of International Application No. PCT/CN2018/090874, filed on Jun. 12, 2018, which claims priority to Chinese Patent Application No. 201710526803.4 filed Jun. 30, 2017, the entire disclosures of which are hereby incorporated by reference.

TECHNICAL FIELD

This disclosure relates to interface display of a mobile terminal, and particularly to a mobile terminal and a method for split screen control thereof, and a computer readable storage medium.

BACKGROUND

The popularity of intelligent mobile terminals greatly facilitates people's life, entertainment, and learning, and more and more things can be done with mobile terminals (such as, mobile phones, tablets, etc.). As screens of the mobile terminals become larger and larger, the demand for multitasking display is increasing. For example, a video window needs to be displayed in upper half of the screen and a chat application window needs to be displayed in lower half of the screen.

SUMMARY

Implementations provide a method for split screen control of a mobile terminal. The method includes the following.

The mobile terminal acquires, in a split screen mode, a first split screen. The mobile terminal detects an instruction for desktop display. The mobile terminal acquires a desktop icon and displays the desktop icon on the first split screen, upon receiving the instruction for desktop display.

Implementations further provide a mobile terminal. The mobile terminal includes a processor and a memory configured to store computer programs. The computer programs are executable on the processor and the processor is configured to: determine, in a split screen mode, a split screen for desktop icon display; and acquire a desktop icon and display the desktop icon on the split screen for desktop icon display, upon receiving an instruction for desktop display.

Implementations further provide a computer readable storage medium. The computer readable storage medium is configured to store computer programs. The computer programs are executed by a processor to: determine, in a split screen mode, a split screen for desktop icon display; detect an instruction for desktop display; and acquire a desktop icon and display the desktop icon on the split screen for desktop icon display, upon receiving the instruction for desktop display.

DETAILED DESCRIPTION

The disclosure will be further described in detail below with reference to the accompanying drawings and implementations. It is understood that the implementations described herein are merely illustrative and are not intended to limit the disclosure.

Figure 1:
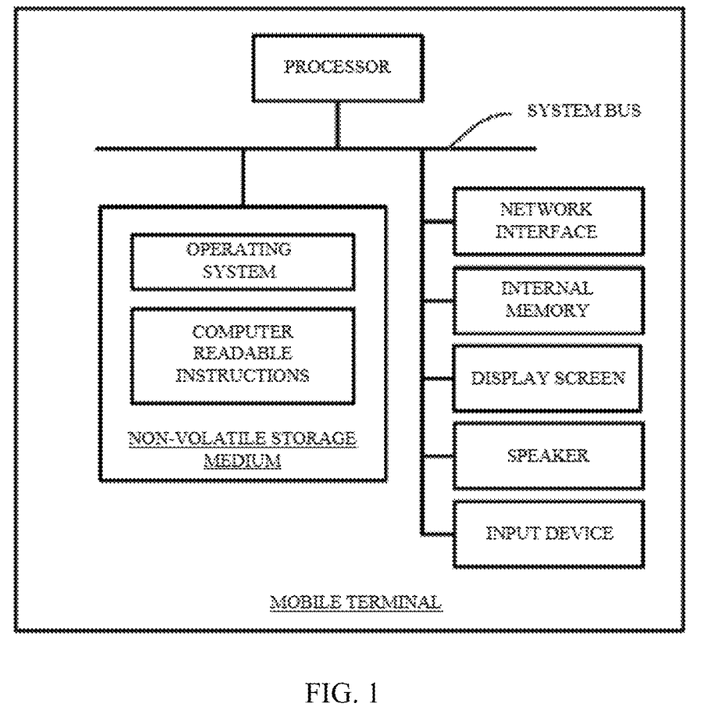
FIG. 1 is a diagram of an inner structure of a mobile terminal according to implementations.

FIG. 1 is a diagram of an inner structure of a mobile terminal according to implementations. As illustrated in FIG. 1, the mobile terminal includes a processor, a non-volatile storage medium, an internal memory, a network interface, a sound collecting device, a speaker, a display screen, and an input device connected through a system bus. The non-volatile storage medium of the mobile terminal is configured to store an operating system and computer readable instructions. The computer readable instructions are configured to be executed by the processor to implement a method for split screen control of the mobile terminal. The processor is configured to provide computing and control capabilities to support operation of the entire mobile terminal. The internal memory of the mobile terminal is configured to provide an environment for operation of the computer readable instructions in the non-volatile storage medium. The display screen of the mobile terminal may be a liquid crystal display or an electronic ink display screen. The input device may be a touch layer covered on the display screen, a button provided on a casing of the mobile terminal, a trackball or a touchpad, or an external keyboard, a touchpad or a mouse, or the like. The mobile terminal can be a mobile phone, a tablet, a personal digital assistant, or a wearable device. It will be understood by those skilled in the art that the structure illustrated in FIG. 1 is only a block diagram of a part of the structure related to the solution of the present application, and does not constitute a limitation of the mobile terminal to which the solution of the present application is applied. The mobile terminal may include more or fewer components than illustrated in FIG. 1, or have additional components or different component arrangements.

In related split-screen modes, display of an application and display of a desktop are not compatible. That is, when applications are displayed on split screens, if a user needs to open other applications, he/she will click the home button, and in this case, the desktop is displayed and the split screen mode is exited. As a result, for returning to the previous state, the user needs to enter the split screen mode again, which affects user experience.

In terms of the above, implementations of the disclosure provide a method for split screen control of a mobile terminal applicable to the mobile terminal above.

Figure 2:
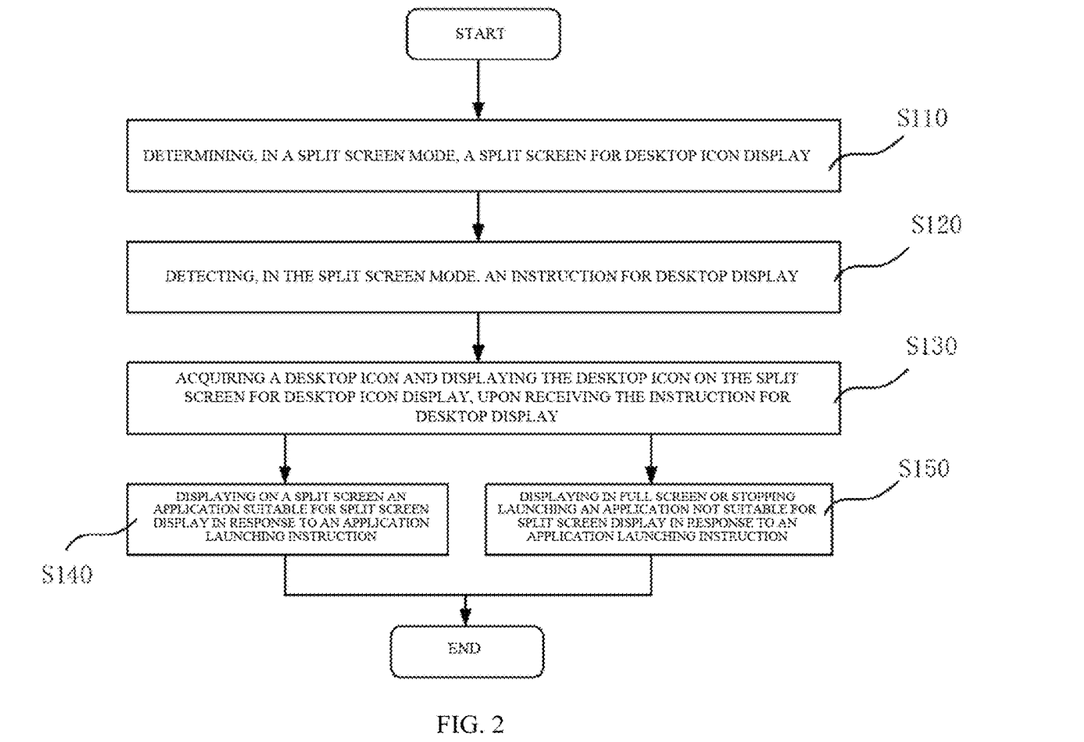
FIG. 2 is a schematic flow chart of a method for split screen control of a mobile terminal according to implementations.

As illustrated in FIG. 2, the method for split screen control of a mobile terminal begins at S110.

At S110, a split screen (designated) for desktop icon display is determined in a split screen mode.

"Split screen display" refers to dividing a display area of an entire screen into at least two different sub-display areas by software. Interfaces of different applications can be displayed on different sub-display areas, and different sub-display areas are defined as split screens. The split screen for desktop icon display can be deemed as a first split screen.

Generally, entering the split screen mode can be trigger by a user. In some cases, it can also be triggered by an application. The split screen mode can be triggered as follows. A system invokes a split screen instruction corresponding to a split screen operation according to a preset operation of the user, to perform split screen display. The Android® system and the Apple (IOS®) system provide a basic framework for implementing split screen display of applications, and an operating system of the mobile terminal can implement split screen display based on the basic framework.

The preset operation of the user may include: shaking the mobile terminal, long pressing a button of a recent task list, selecting a split screen instruction from a drop-down menu, using multiple buttons in combination, or the like. After the split screen mode is triggered, the operating system can generate at least two split screens according to a default number of split screens or a number of split screens specified by the user.

After the split screen mode is triggered, the interfaces of different applications can be displayed on different split screens. In an implementation, the mobile terminal displays multiple running applications on at least two split screens respectively, after the split screen mode is triggered. The mobile terminal displays the multiple running applications on the at least two split screens respectively, when a number of the multiple running applications is less than or equal to a number of the at least two split screens. The mobile terminal displays, according to user selection or preset logic, running applications of which a number is equal to that of the at least two split screens on the at least two split screens respectively, when the number of the multiple running applications is greater than the number of the at least two split screens. An application to be displayed on each split screen can be selected by the user. For example, a list on running applications is presented in each split screen, if a running application is selected from the list by the user, the running application selected is displayed on a split screen. Thereafter, the running application selected is removed from the list, and the new list is presented in remaining split screens. The preset logic can include: wake-up times or usage times of the multiple running applications, recent use duration of the multiple running applications, and so on.

After the above, the mobile terminal is in a state of split screen display (split screen mode), that is, the display area of the entire screen is divided into at least two split screens with obvious boundaries, and applications are displayed or not displayed on split screens, or display of an application(s) are stopped. Because the split screen mode is to serve the situation where multiple applications run simultaneously, generally, at least one split screen is for application display.

Figure 3:
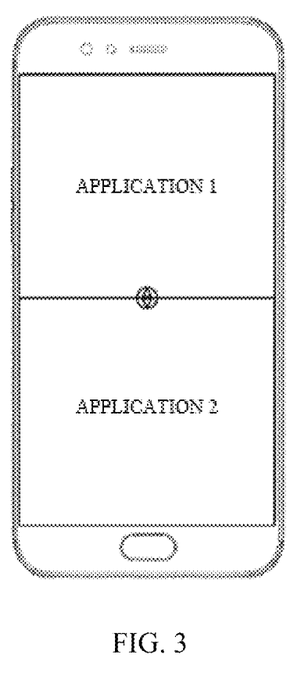
FIG. 3 is a display interface of a terminal.

As illustrated in FIG. 3, the entire screen is divided into two split screens (an upper split screen and a lower split screen), and "application 1" and "application 2" are respectively displayed on the two split screens. For example, "application 1" is a calculator, and "application 2" is a browser. In this case, the mobile terminal is said to be in the split screen mode.

In the split screen mode, although all applications displayed in at least two split screens are in the running state, operations on some certain buttons still need to specify which application is being operated, for example, an "return" operation. In this case, a split screen of the application that is being operated needs to be activated, so that the "return" operation can be applied to the application in the split screen activated. A split screen can be activated by selecting this split screen, or performing some operations first in this split screen. In this example, in the split screen mode, in order to return to a desktop to start a new application without exiting the split screen mode, it is necessary to use one of the at least two split screens to display a desktop icon (application icon on the desktop). Similarly, one of the at least two split screens can be specified to display the desktop icon.

At S120, an instruction for desktop display is detected in the split screen mode.

The instruction for desktop display is configured to inform the system to display the desktop icon, so that a new application(s) can be started by the user. The instruction for desktop display can be detected in the background of the system. When the mobile terminal is in the split screen mode, the applications on the at least two split screens can be displayed in the foreground, and the user can also interact with the at least two split screens respectively. In the split screen mode, the user may need to return to the desktop to launch a new application. In this case, the instruction for desktop display can be submitted to the system by the user. After the instruction for desktop display is detected in the background, proceed to S130.

At S130, a desktop icon(s) is acquired and displayed on the split screen for desktop icon display, upon receiving the instruction for desktop display.

The split screen for desktop icon display can be a blank split screen or a split screen with an application displayed thereon. If the split screen for desktop icon display is a split screen with an application displayed thereon, the application displayed thereon can be converted to run in the background instead of being displayed in the foreground.

The desktop icon is acquired according to an interface provided by a system. In an example, all desktop icons are acquired and displayed on the split screen for desktop icon display. When it is impossible to fully display all the desktop icons on the split screen for desktop icon display, all the desktop icons are displayed in a scrollable or page-based manner.

In another example, part of desktop icons is acquired and displayed on the split screen for desktop icon display. The part of desktop icons is defined by the user and saved as a list in advance or selected according to preset logic by the system. It is noted that multiple lists are possible. The preset logic includes: most frequently used top N applications, a list of commonly used system services (e.g., setting, Wi-Fi switches, etc.), and top N of most frequently used applications in most recent period of time. It can be understood that the preset logic can also be a combination of the above, such as intersection, union, and the like. Since one split screen is of a limited size, if all the desktop icons are displayed in one split screen, a target application may not be easily found by the user, so the part of desktop icons can be displayed to reduce time for searching the target application of the user.

In an example, the desktop icon is acquired in real time. In another example, the desktop icon is acquired and saved as a file or in a database in advance, and the desktop icon is read from the file or the database for display when needed.

In view of the above, the desktop icon is acquired as follows.

In an example, all the desktop icons are acquired in real time.

In another example, the desktop icon is acquired in real time according to a list specified by a user in advance.

In another example, which desktop icons need to be acquired is calculated in real time according to preset logic, and then these desktop icons are acquired.

In another example, all the desktop icons are acquired and saved as a file or in a database in advance.

In another example, the desktop icon is acquired and saved as a file or in a database according to a list specified by a user in advance.

In another example, which desktop icons need to be acquired is calculated according to preset logic, and then these desktop icons are acquired and saved as a file or in a database.

In other examples, the desktop icon can be obtained in other ways as long as the desktop icon meeting the user's needs can be obtained. It can be understood that the above manners can be combined and provided to the user for selection, to achieve higher flexibility. For example, the user is asked to select whether to obtain all the desktop icons, or only part of desktop icons according to the preset logic.

Furthermore, a split screen with or without the desktop icon displayed thereon can be provided with a search portal, so that an icon of the target application can be searched in this split screen by the user. It is possible to find the icon of the target application quickly and launch the target application in this split screen.

Furthermore, a desktop background is further acquired while the desktop icon is acquired, and the desktop background is further displayed on the split screen for desktop icon display while the desktop icon is displayed on the split screen for desktop icon display. In this way, the split screen for desktop icon display looks just like the desktop and thus user experience can be improved.

According to the method, as when the instruction for desktop display is received, only the desktop icon is acquired and displayed in the split screen for desktop icon display, the mobile terminal can remain in the split screen mode. The desktop icon can be operated by the user in the split screen for desktop icon display and a new application can be launched without exiting the split screen mode to return to the desktop.

Furthermore, the method can further include S140 and S150.

At S140, an application suitable for split screen display is displayed on a split screen (a second split screen) in response to an application launching instruction. In other words, the mobile terminal displays on the second split screen an application to be launched in response to the application launching instruction, when the application to be launched is suitable for split screen display. Based on the above method, a new application can be launched without exiting the split screen mode. S140 is to illustrate launching of the new application. Among operations on the mobile terminal, clicking a desktop icon can launch an application or enable a function. "Launching an application" means launching an application program, such as, a calculator, a browser, or the like. "Enabling a function" means using a system function, for example, setting, album, or the like. All these are started through clicking a desktop icon.

After the desktop icons are displayed on the split screen for desktop icon display, a desktop icon is clicked in the split screen for desktop icon display to launch an application, and at this time, the application launching instruction is generated. Launching of the application is processed according to the application launching instruction. If the application is suitable for split screen display, after the application launching instruction is generated, the application is displayed on a split screen.

The above split screen (second split screen) can be the split screen for desktop icon display. In this case, process from S110~S140 can be summarized as: entering the split screen mode, acquiring the split screen for desktop icon display, displaying the desktop icon on the split screen for desktop icon display, clicking a desktop icon, launching an application corresponding to the desktop icon, and displaying the application on the split screen for desktop icon display. The above process is smooth and in line with user habits. It is possible to launch a new application without exiting the split screen mode and bring good experience to the user.

The above split screen can be a split screen with or without contents displayed thereon and different from the split screen for desktop icon display. As discussed above, the number of the at least two split screens can be greater than the number of the multiple running applications, and in this case, a blank split screen(s) may exist. In an example, the new application to be launched is displayed on the blank split screen. In another example, the new application to be launched is displayed on a split screen on which an application (i.e. an application that no longer needs to be displayed) has been displayed, as specified by the user.

At S150, an application not suitable for split screen display will be displayed in full screen or it will not be launched, in response to an application launching instruction. In other words, the mobile terminal displays in full screen or stops launching an application to be launched in response to the application launching instruction, when the application to be launched is not suitable for split screen display. Based on S140, if an application (to be launched) is not suitable for split screen display, for example, the application is capable of displaying in full screen only, then the application is displayed in full screen or is not launched. It can be selected by default to display in full screen or not launch, or it can be provided to the user for selection and then processed according to the user selection.

Figure 4:
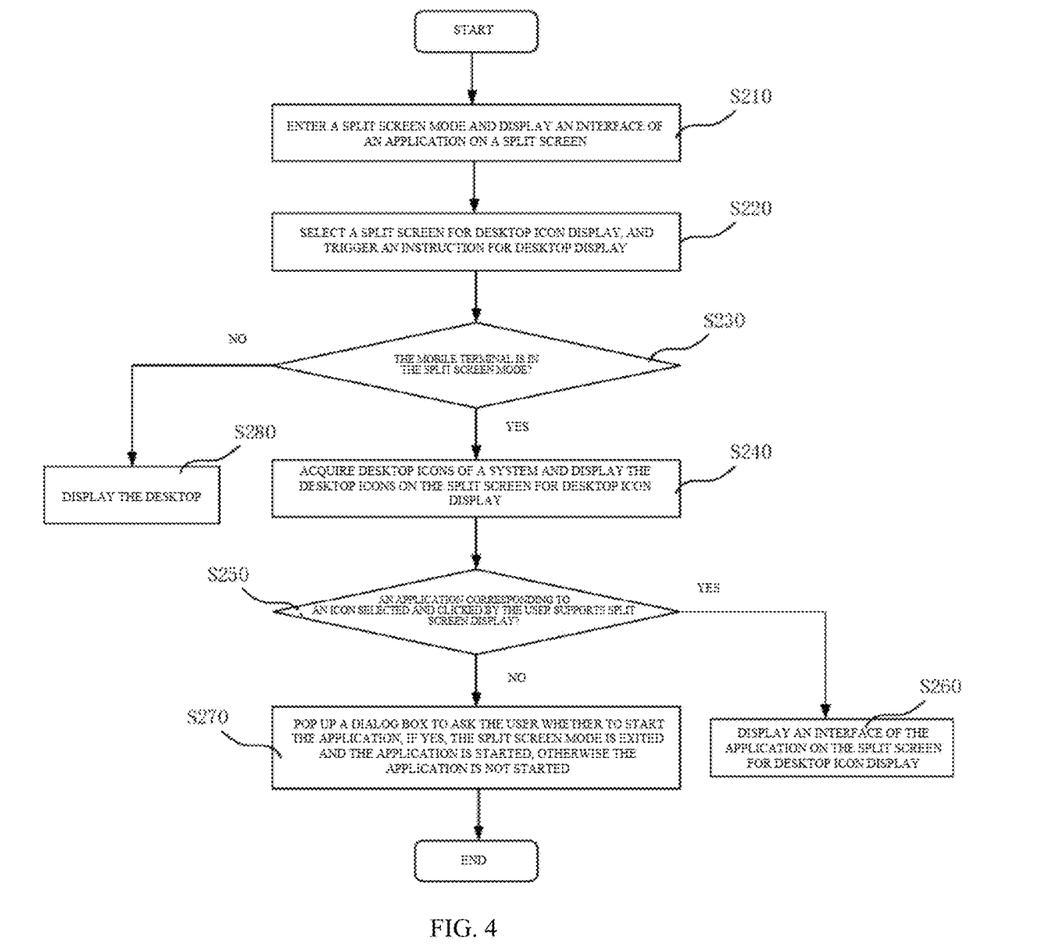
FIG. 4 is a process flow in a scenario.

The above method is exemplified below based on a common scenario. As illustrated in FIG. 4, a process flow in a scenario is provided.

Figure 5A:
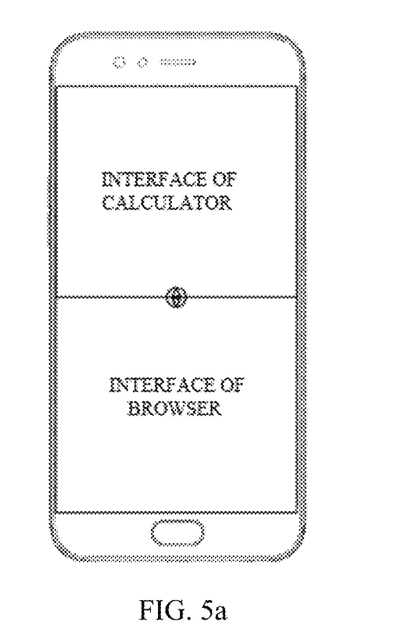
FIGS. 5a-5c are schematic diagrams illustrating changes in an interface of a mobile terminal in the scenario of FIG. 4.

At S210, enter a split screen mode and display an interface of an application on a split screen (a split screen can be deemed as a window). Typically, if at least one application is running, the above is achieved by long pressing a button of a recent task list. The button is configured in most smart terminals. If the button is clicked, the recent task list can be displayed. If the button is long pressed, the entire screen of a mobile terminal will be divided into two split screens of equal size: an upper split screen and a lower split screen. A current application will be displayed in one of two the split screens, and the recent task list excluding the current application will be displayed in the other split screen of two the split screens. After one of most recent tasks is selected by the user, the selected application will then be displayed on the other split screen. In this case, the upper split screen and the lower split screen each display an interface of an application. For example, as illustrated in FIG. 5a, the upper split screen displays an interface of "calculator", and the lower split screen displays an interface of "browser".

At S220, select a split screen for desktop icon display (a current window), and trigger an instruction for desktop display. For example, select the lower split screen, i.e., the split screen displaying the interface of "browser". The home button is generally used to trigger the instruction for desktop display. In the related operations, after clicking the home button, all applications are transferred to the background, and the entire desktop is displayed. In this scenario, clicking the home button is also used to trigger the instruction for desktop display. The disclosure is not limited herein.

At S230, determine whether the mobile terminal is in the split screen mode, if yes, proceed to S240, otherwise, proceed to S280.

Figure 5B:
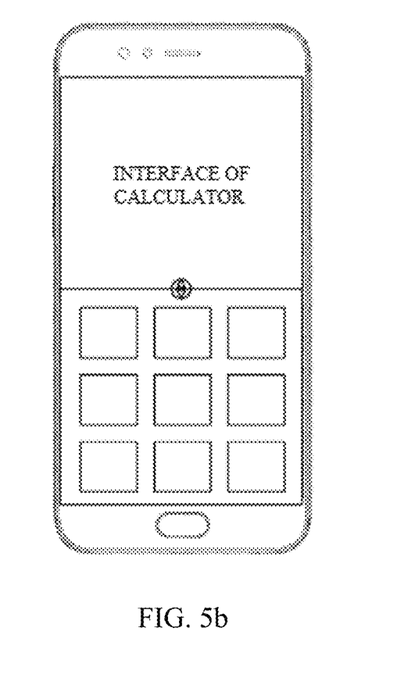

At S240, acquire desktop icons of a system and display the desktop icons on the split screen for desktop icon display. That is, after the instruction for desktop display is received, the desktop icons are displayed on the lower split screen, and in this case the interface of "browser" is no longer displayed, as illustrated in FIG. 5b. An application to be launched can be chosen by the user in the lower split screen.

At S250, determine whether an application corresponding to an icon selected and clicked by the user supports split screen display, and if yes, proceed to S260, otherwise, proceed to S270.

Figure 5C:
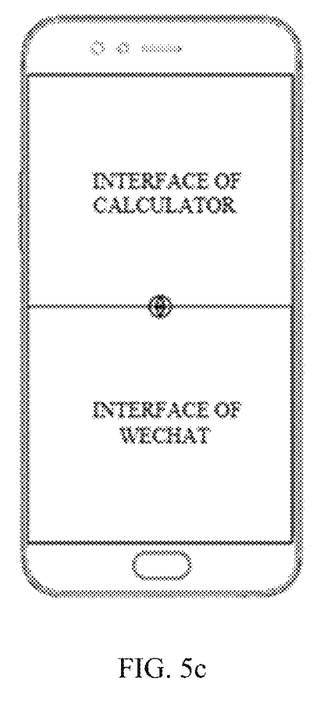

At S260, display an interface of the application on the split screen for desktop icon display. For example, if "WeChat®" is chosen by the user, an interface of "WeChat" is displayed on the lower split screen, as illustrated in FIG. 5c.

At S270, a dialog box is popped up to ask the user whether to start the application. If yes, the split screen mode is exited and the application is started, otherwise the application is not started.

At S280, display the desktop. If the terminal is not in the split screen mode, the desktop is displayed.

Figure 6:
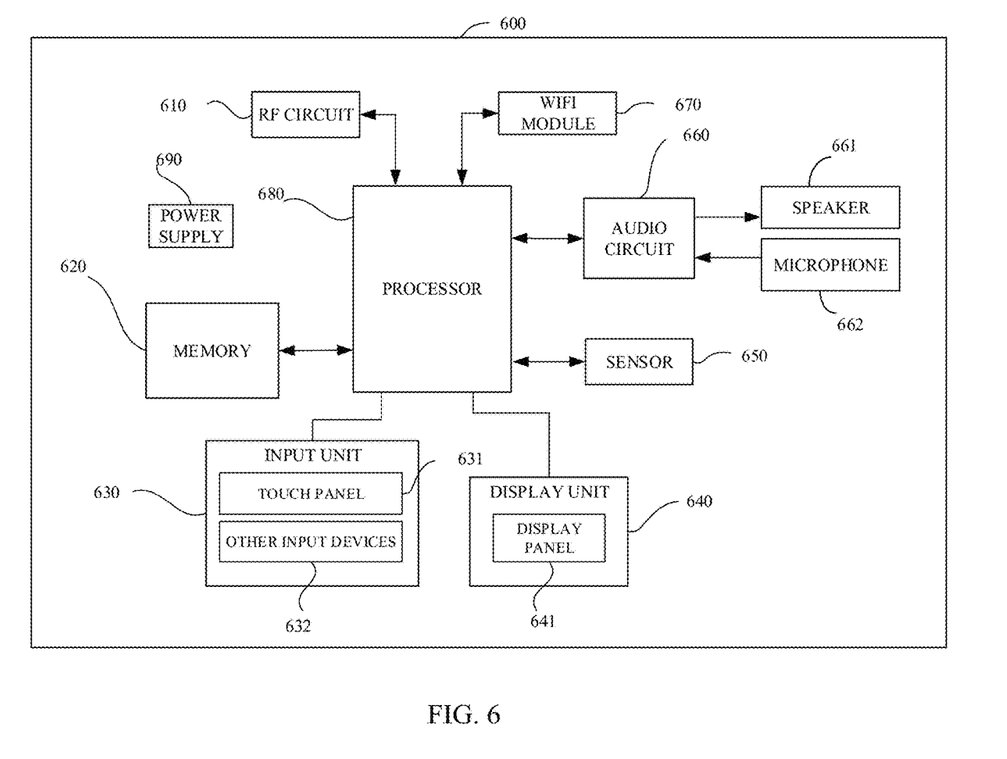
FIG. 6 is a block diagram illustrating a part of structure of a mobile terminal related to a computer device according to implementations.

Implementations further provide a computer device. As illustrated in FIG. 6, only parts related to the implementations of the present disclosure are illustrated for ease of description. For technical details not described, reference may be made to the method implementations of the present disclosure. The computer device may be any terminal device, such as a mobile terminal, a tablet computer, a personal digital assistant (PDA), a point of sale terminal (POS), an on-board computer, a wearable device, and the like. The following describes the mobile terminal as an example of the computer device.

FIG. 6 is a structural diagram illustrating parts of a mobile terminal related to the computer device according to implementations. As illustrated in FIG. 6, the mobile terminal includes a radio frequency (RF) circuit 610, a memory 620, an input unit 630, a display unit 640, a sensor 650, an audio circuit 660, a wireless fidelity (Wi-Fi) module 670, a processor 680, a power supply 690 and other components. Those skilled in the art can understand that the structure of the mobile terminal illustrated in FIG. 6 does not constitute any limitation on a mobile terminal. The mobile terminal configured to implement technical solutions of the disclosure may include more or fewer components than illustrated or may combine certain components or different components.

The RF circuit 610 can be configured to transmit and receive information, or receive and transmit signals during a call. The RF circuit 610 can be configured to receive downlink information of a base station and send it to the processor 680 for process, and to send uplink data to the base station. Generally, the RF circuit 610 includes but is not limited to an antenna, at least one amplifier, a transceiver, a coupler, a low noise amplifier (LNA), a duplexer, and the like. In addition, the RF circuit 610 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 620 is configured to store software programs and modules, and the processor 680 is configured to execute various function applications and data processing of the mobile terminal by running the software programs and the modules stored in the memory 620. The memory 620 mainly includes a program storage area and a data storage area. The program storage area may store an operating system, application programs (an application program with a sound playing function, an application program with an image playing function, and the like) required for at least one function, and so on. The data storage area may store data (such as audio data, address book, etc.) created according to use of the mobile terminal, and so on. In addition, the memory 620 may include a high-speed RAM, and may further include a non-volatile memory such as at least one disk storage device, a flash memory device, or other non-volatile solid-state storage devices.

The input unit 630 may be configured to receive input digital or character information and generate key signal input associated with user setting and function control of the mobile terminal. The input unit 630 may include a touch panel 631 and other input devices 632. The touch panel 631 can collect fingerprint data of the user. The touch panel 631, also called a touch screen, is configured to collect touch operations (for example, operations of the user on the touch panel 631 or near the touch panel 631 using any suitable object or accessory such as a finger or a stylus) on or near it of the user and drive a corresponding connection device according to a preset program. In one example, the touch panel 631 can include two parts: a touch detection device and a touch controller. The touch detection device is configured to detect touch orientation of the user, and detect a signal brought by the touch operation, and transmit the signal to the touch controller. The touch controller is configured to receive touch information from the touch detection device and convert the touch information into contact coordinates, send the contact coordinates to the processor 680, and receive and execute a command from the processor 680. Furthermore, the touch panel 631 can be implemented in various types such as resistive, capacitive, infrared, and surface acoustic waves. In addition to the touch panel 631, the input unit 630 may further include other input devices 632. The other input devices 632 may include, but are not limit to, one or more of a physical key, a function key (such as a volume control key, a switch key, etc.), and the like.

The display unit 640 is configured to display information input by the user or information provided for the user or various menus of the mobile terminal. The display unit 640 may include a display panel 641. The display panel 641 may be in the form of a liquid crystal display (LCD), an organic light-emitting diode (OLED), and so on. Furthermore, the touch panel 631 can cover the display panel 641. When the touch panel 631 detects a touch operation on or near it, the touch operation is transmitted to the processor 680 to determine a type of touch event, and then the processor 680 provides a corresponding visual output on the display panel 641 depending on the type of touch event. Although the touch panel 631 and the display panel 641 are illustrated as two separate components in FIG. 6 to realize the input and output functions of the mobile terminal, in other examples, the touch panel 631 may be integrated with the display panel 641 to implement the input and output functions of the mobile terminal.

The mobile terminal may also include at least one sensor 650, such as a light sensor, a motion sensor, and other sensors. The light sensor may include an ambient light sensor and a proximity sensor, among which the ambient light sensor may adjust the brightness of the display panel 641 according to ambient lights, and the proximity sensor may turn off the display panel 641 and/or backlight when the mobile terminal reaches nearby the ear. The motion sensor can include an accelerometer sensor which can detect the magnitude of acceleration in all directions and when the mobile terminal is stationary, the accelerometer sensor can detect the magnitude and direction of gravity; the accelerometer sensor can also identify gestures of the mobile terminal (such as vertical and horizontal screen switch), or the accelerometer sensor can be used for vibration-recognition related functions (such as a pedometer, percussion) and so on. The mobile terminal can also be equipped with a gyroscope, a barometer, a hygrometer, a thermometer, and an infrared sensor and other sensors.

The audio circuit 660, a speaker 661, a microphone 662 may provide an audio interface between the user and the mobile terminal. The audio circuit 660 may convert the received audio data into electrical signals and transfer the electrical signals to the speaker 661; thereafter the speaker 661 converts the electrical signals into sound signals for output. On the other hand, the microphone 662 converts the received sound signals into electrical signals, which will be received and converted into audio data by the audio circuit 660 for output. The audio data is then processed and transmitted by the processor 680 via the RF circuit 610 to another mobile terminal for example, or the audio data is output to the memory 620 for further processing.

Wi-Fi belongs to a short-range wireless transmission technology. With aid of the Wi-Fi module 670, the mobile terminal may assist the user in E-mail receiving and sending, webpage browsing, access to streaming media, and the like. Wi-Fi provides users with wireless broadband Internet access. Although the Wi-Fi module 670 is illustrated in FIG. 6, it can be understood that, the Wi-Fi module 670 is not essential to the mobile terminal and can be omitted according to actual needs.

The processor 680 is the control center of the mobile terminal and is configured to connect various parts of the whole mobile terminal through various interfaces and lines, run or execute software programs and/or modules stored in the memory 620, and invoke data stored in the memory 620 to perform various functions of the mobile terminal and process data, thereby monitoring the mobile terminal as a whole. The processor 680 may include one or more processing units. For example, the processor 680 may integrate an application processor and a modem processor, where the application processor is configured to handle the operating system, the user interface, the application, and so on, and the modem processor is mainly configured to process wireless communication. It will be understood that the above-mentioned modem processor may not be integrated into the processor 680.

The mobile terminal 600 also includes a power supply 690 (e.g., a battery) that supplies power to various components. For instance, the power supply 690 may be logically connected to the processor 680 via a power management system to enable management of charging, discharging, and power consumption through the power management system.

The mobile terminal may include a camera, a Bluetooth module, etc.

In the implementations, the processor 680 included in the computer device implements the methods of the above implementations when executing computer programs stored in the memory.

Those skilled in the art can understand that all or part of the process in implementing the foregoing implementation method can be completed by using computer programs to instruct related hardware. The computer programs can be stored in a non-transitory computer readable storage medium. When executed, the computer programs can implement the flow of implementations of the methods described above. The storage medium may be a magnetic disk, an optical disk, a read-only memory (ROM), or the like. Implementations of the disclosure further provides a computer readable storage medium. The computer readable storage medium is configured to store computer programs. The computer programs are executed by a processor to execute the methods of various implementations described above.

The technical features of the above-mentioned implementations may be combined in any combination. For brevity of description, not all possible combinations of the technical features in the above implementations are described. However, as long as there is no contradiction in combination of these technical features, it should be considered as the scope of the present specification.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for split screen control of a mobile terminal, comprising:

displaying interfaces of different applications on different split screens after a split screen mode is triggered, wherein displaying the interfaces of different applications on different split screens comprises: displaying a plurality of running applications on at least two split screens respectively, when a number of the plurality of running applications is less than or equal to a number of the at least two split screens; and displaying, according to a first preset logic, running applications of which a number is equal to that of the at least two split screens on the at least two split screens respectively, when the number of the plurality of running applications is greater than the number of the at least two split screens, wherein the first preset logic comprises at least one of: wake-up times or usage times of the plurality of running applications, or recent use duration of the plurality of running applications;

determining, in the split screen mode where interfaces of different applications are displayed on different split screens, a first split screen for desktop icon display, wherein in the split screen mode a display area of an entire screen is divided into at least two different split screens and the at least two different split screens comprise the first split screen;

detecting an instruction for desktop display;

acquiring a desktop icon and displaying the desktop icon on the first split screen, upon receiving the instruction for desktop display, wherein the desktop icon displayed on the first split screen is part of desktop icons of the mobile terminal, and the part of desktop icons is determined according to a second preset logic, the second preset logic comprising most frequently used top N applications, a list of commonly used system services, and top N of most frequently used applications in most recent period of time; and displaying in full screen or stopping launching an application not suitable for split screen display in response to an application launching instruction.

2. The method of claim 1, further comprising:

after displaying the desktop icon on the first split screen, displaying on a second split screen an application suitable for split screen display in response to an application launching instruction.

3. The method of claim 1, wherein displaying in full screen or stopping launching the application not suitable for split screen display comprises:

asking a user to select displaying in full screen or stopping launching the application not suitable for split screen display; and displaying in full screen or stopping launching the application not suitable for split screen display according to user selection.

4. The method of claim 1, further comprising:

before displaying the desktop icon on the first split screen, when an application is already displayed on the first split screen, controlling the application to run in background.

5. The method of claim 1, further comprising:

acquiring the desktop icon in real time;

acquiring and saving the desktop icon in advance and reading the desktop icon when needed;

acquiring the desktop icon in real time according to a list specified by a user in advance; or calculating and acquiring the desktop icon in real time according to the second preset logic.

6. The method of claim 1, further comprising:

acquiring a desktop background while acquiring the desktop icon; and displaying the desktop background on the first split screen while displaying the desktop icon on the first split screen.

7. The method of claim 1, further comprising:

acquiring the desktop icon according to an interface provided by an operating system of the mobile terminal.

8. A mobile terminal, comprising a processor and a memory configured to store computer programs, wherein the computer programs are executable on the processor and the processor is configured to:

display interfaces of different applications on different split screens after a split screen mode is triggered, wherein the processor configured to display the interfaces of different applications on different split screens is configured to: display a plurality of running applications on at least two split screens respectively, when a number of the plurality of running applications is less than or equal to a number of the at least two split screens; and display, according to a first preset logic, running applications of which a number is equal to that of the at least two split screens on the at least two split screens respectively, when the number of the plurality of running applications is greater than the number of the at least two split screens, wherein the first preset logic comprises at least one of: wake-up times or usage times of the plurality of running applications, or recent use duration of the plurality of running applications;

determine, in the split screen mode where interfaces of different applications are displayed on different split screens, a split screen for desktop icon display, wherein in a split screen mode a display area of an entire screen is divided into at least two different split screens and the at least two different split screens comprise a first split screen;

acquire a desktop icon and display the desktop icon on the split screen for desktop icon display, upon receiving an instruction for desktop display, wherein the desktop icon displayed on the first split screen is part of desktop icons of the mobile terminal, and the part of desktop icons is determined according to a second preset logic, the second preset logic comprising most frequently used top N applications, a list of commonly used system services, and top N of most frequently used applications in most recent period of time; and display in full screen or stop launching an application not suitable for split screen display in response to an application launching instruction.

9. The mobile terminal of claim 8, wherein the processor is further configured to:

display on a split screen, an application suitable for split screen display, in response to an application launching instruction, after displaying the desktop icon on the split screen for desktop icon display.

10. The mobile terminal of claim 8, wherein the processor is further configured to:

control an application to run in background when the application is already displayed on the split screen for desktop icon display.

11. A non-transitory computer readable storage medium configured to store computer programs which, when executed by a processor, causes the processor to:

display interfaces of different applications on different split screens after a split screen mode is triggered, wherein the processor configured to display the interfaces of different applications on different split screens is configured to: display a plurality of running applications on at least two split screens respectively, when a number of the plurality of running applications is less than or equal to a number of the at least two split screens; and display, according to a first preset logic, running applications of which a number is equal to that of the at least two split screens on the at least two split screens respectively, when the number of the plurality of running applications is greater than the number of the at least two split screens, wherein the first preset logic comprises at least one of: wake-up times or usage times of the plurality of running applications, or recent use duration of the plurality of running applications;

determine, in a split screen mode where interfaces of different applications are displayed on different split screens, a split screen for desktop icon display, wherein in the split screen mode a display area of an entire screen is divided into at least two different split screens and the at least two different split screens comprise a first split screen;

detect an instruction for desktop display;

acquire a desktop icon and display the desktop icon on the split screen for desktop icon display, upon receiving the instruction for desktop display, wherein the desktop icon displayed on the first split screen is part of desktop icons of a mobile terminal, and the part of desktop icons is determined according to a second preset logic, the second preset logic comprising most frequently used top N applications, a list of commonly used system services, and top N of most frequently used applications in most recent period of time; and display in full screen or stop launching an application not suitable for split screen display in response to an application launching instruction.

12. The non-transitory computer readable storage medium of claim 11, wherein the computer programs, when executed by the processor, further cause the processor to:

display on a split screen, an application suitable for split screen display, in response to an application launching instruction, after displaying the desktop icon on the split screen for desktop icon display.

13. The non-transitory computer readable storage medium of claim 11, wherein the computer programs, when executed by the processor, further cause the processor to:

control an application to run in background when the application is already displayed on the split screen for desktop icon display.

\* \* \* \* \*